US011909138B2

(12) United States Patent
Kitamura

(10) Patent No.: US 11,909,138 B2
(45) Date of Patent: Feb. 20, 2024

(54) TERMINAL ASSEMBLY INCLUDING FLAT SURFACE FORMED AND ALIGNED FOR ACHIEVING FLAT CONTACT WITH MATING TAB

(71) Applicant: SUMITOMO WIRING SYSTEMS, LTD., Mie (JP)

(72) Inventor: Keishi Kitamura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 42 days.

(21) Appl. No.: 17/681,184

(22) Filed: Feb. 25, 2022

(65) Prior Publication Data

US 2022/0294143 A1 Sep. 15, 2022

(30) Foreign Application Priority Data

Mar. 10, 2021 (JP) ................................ 2021-037925

(51) Int. Cl.
*H01R 13/11* (2006.01)
*H01R 4/18* (2006.01)

(52) U.S. Cl.
CPC ........... *H01R 13/111* (2013.01); *H01R 4/185* (2013.01)

(58) Field of Classification Search
CPC .............................. H01R 13/111; H01R 4/185
USPC .......................................................... 439/881
See application file for complete search history.

(56) References Cited

U.S. PATENT DOCUMENTS 5,707,259 A * 1/1998 Ishizuka .............. H01R 13/113 439/852
5,716,245 A * 2/1998 Kameyama ............ H01R 13/11 439/852
6,520,811 B2 * 2/2003 Mitani ................. H01R 13/113 439/852
6,790,100 B2 * 9/2004 Nankou ............... H01R 13/113 439/851
7,530,859 B2 * 5/2009 Moll .................... H01R 13/113 439/852
7,717,759 B2 * 5/2010 Ishigami .............. H01R 13/114 439/852

(Continued)

FOREIGN PATENT DOCUMENTS

DE 10021972 A1 * 12/2000 ........... H01R 13/187
DE 102008025134 A1 * 2/2009 ........... H01R 13/111

(Continued)

*Primary Examiner* — Peter G Leigh
(74) *Attorney, Agent, or Firm* — Venjuris, P.C.

(57) ABSTRACT

A terminal includes a male terminal and a female terminal to be connected to each other. The male terminal includes a tab having a circular cross-section. The female terminal includes a body portion having a connecting space S formed inside, the tab being arranged in the connecting space S. The body portion includes a resiliently deformable resilient contact piece and a pair of receiving portions. The resilient contact piece has a variable connection surface arranged toward a center SO of the connecting space S when viewed from a connecting direction. The pair of receiving portions are arranged on a side opposite to the resilient contact piece across the connection space S and have a pair of flat fixed connection surfaces inclined to spread toward the variable connection surface. An opening angle of the pair of fixed connection surfaces is constant in the connecting direction.

4 Claims, 8 Drawing Sheets

(56) References Cited

U.S. PATENT DOCUMENTS

| | | | | |
|---|---|---|---|---|
| 8,128,441 | B2 * | 3/2012 | Mukuno | H01R 13/055 439/845 |
| 8,267,729 | B2 * | 9/2012 | Yamashita | H01R 13/432 439/857 |
| 8,454,395 | B2 * | 6/2013 | Xu | H01R 13/11 439/852 |
| 8,616,924 | B2 * | 12/2013 | Ishida | H01R 13/113 439/851 |
| 9,673,549 | B2 * | 6/2017 | Nakano | H01R 13/111 |
| 2003/0220015 | A1 * | 11/2003 | Ishiyama | H01R 13/187 439/595 |
| 2008/0188144 | A1 * | 8/2008 | Myer | H01R 13/113 439/852 |
| 2009/0035975 | A1 * | 2/2009 | Arai | H01R 13/111 439/259 |
| 2009/0036001 | A1 * | 2/2009 | Ishigami | H01R 4/184 439/816 |
| 2009/0197479 | A1 * | 8/2009 | Glick | H01R 4/185 439/752 |
| 2010/0029146 | A1 * | 2/2010 | Myer | H01R 13/15 439/852 |
| 2016/0181706 | A1 * | 6/2016 | Nakano | H01R 13/111 439/877 |
| 2020/0381846 | A1 * | 12/2020 | Shinohara | H01R 4/48 |

FOREIGN PATENT DOCUMENTS

| | | | | | |
|---|---|---|---|---|---|
| DE | 102015007536 | A1 | * | 12/2016 | H01R 13/18 |
| EP | 1351338 | A1 | * | 10/2003 | H01R 13/113 |
| JP | H05-182711 | A | | 7/1993 | |
| JP | H09-035794 | A | | 2/1997 | |
| JP | 2009-021187 | A | | 1/2009 | |
| JP | 2016024892 | A | * | 2/2016 | |
| JP | 2016136542 | A | * | 7/2016 | |
| JP | 2020-194716 | A | | 12/2020 | |

* cited by examiner

TERMINAL ASSEMBLY INCLUDING FLAT SURFACE FORMED AND ALIGNED FOR ACHIEVING FLAT CONTACT WITH MATING TAB

CROSS-REFERENCE TO RELATED APPLICATIONS

This application is based on and claims priority from Japanese Patent Application No. 2021-037925, filed on Mar. 10, 2021, with the Japan Patent Office, the disclosure of which is incorporated herein in their entireties by reference.

TECHNICAL FIELD

The present disclosure relates to a terminal.

BACKGROUND

Japanese Patent Laid-open Publication No. H05-182711 discloses a female terminal (triangular contact). A male terminal (connector pin) is in contact with this female terminal at three points. Note that the female terminal is also disclosed in Japanese Patent Laid-open Publication Nos. H09-035794, 2020-194716 and 2009-021187.

SUMMARY

In the configuration of Japanese Patent Laid-open Publication No. H05-182711, it is not clear whether contact parts of the female terminal with the male terminal at three positions are fixed pieces or resilient pieces. If the contact parts are fixed pieces, a dimensional tolerance of the male terminal cannot be absorbed. Thus, it is difficult to bring the two terminals into contact at a proper contact pressure. Further, if the contact parts are resilient pieces, a contact state, a contact pressure and the like need to be individually adjusted at each contact position. Thus, management in manufacturing is difficult.

Accordingly, it is aimed to provide a technique capable of facilitating the management in manufacturing of a terminal.

The present disclosure is directed to a terminal with a male terminal and a female terminal to be connected to each other, wherein the male terminal includes a tab having a circular cross-section, the female terminal includes a body portion having a connecting space formed inside, the tab being arranged in the connecting space, the body portion includes a resiliently deformable resilient contact piece and a pair of receiving portions, the resilient contact piece has a variable connection surface arranged toward a center of the connecting space when viewed from a connecting direction of the male terminal to the female terminal, a distance between the variable connection surface and the center of the connection space is variable due to deflection and deformation of the resilient contact piece, the pair of receiving portions are arranged on a side opposite to the resilient contact piece across the connection space and have a pair of flat fixed connection surfaces inclined to spread toward the variable connection surface, distances between the pair of fixed connection surfaces and the center of the connection space are constant, and an opening angle of the pair of fixed connection surfaces is constant in the connecting direction.

According to the present disclosure, it is possible to facilitate the management in manufacturing of a terminal.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
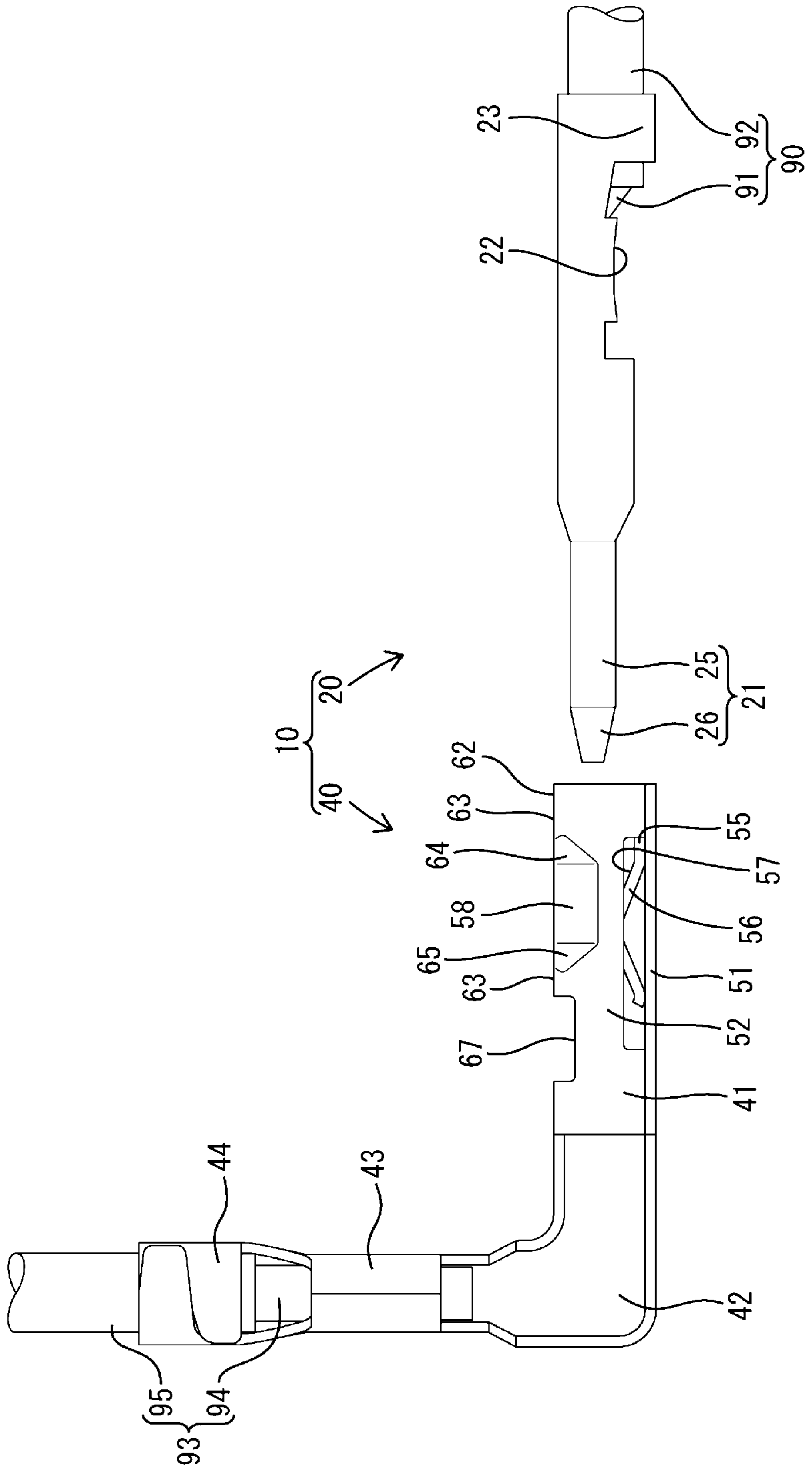
FIG. 1 is a side view of a male terminal and a female terminal of a first embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The terminal of the present disclosure includes a male terminal and a female terminal to be connected to each other, wherein the male terminal includes a tab having a circular cross-section, the female terminal includes a body portion having a connecting space formed inside, the tab being arranged in the connecting space, the body portion includes a resiliently deformable resilient contact piece and a pair of receiving portions, the resilient contact piece has a variable connection surface arranged toward a center of the connecting space when viewed from a connecting direction of the male terminal to the female terminal, a distance between the variable connection surface and the center of the connection space is variable due to deflection and deformation of the resilient contact piece, the pair of receiving portions are arranged on a side opposite to the resilient contact piece across the connection space and have a pair of flat fixed connection surfaces inclined to spread toward the variable connection surface, distances between the pair of fixed connection surfaces and the center of the connection space are constant, and an opening angle of the pair of fixed connection surfaces is constant in the connecting direction.

According to this configuration, the male terminal can be stably held in the connection space by bringing the tab having a circular cross-section into contact with the variable connection surface and the pair of fixed connection surfaces. Further, since a dimensional tolerance of the male terminal can be absorbed only by one variable connection surface, management in manufacturing is easier. Furthermore, since the opening angle of the pair of fixed connection surfaces is constant in the connecting direction, the tab can be guided in the connecting direction in a connection process. Therefore, it can be suppressed that the tab is inclined in the connection process to contact an inner side surface of the body portion.

(2) Preferably, the body portion is in the form of a rectangular tube having four walls, and the receiving portion is formed by inclining a corner portion connecting two adjacent ones of the walls.

According to this configuration, the receiving portions can be easily formed by press-working or the like.

(3) Preferably, the corner portion connecting the two adjacent ones of the walls includes angular portions protruding outward on both sides in the connecting direction across the receiving portion.

According to this configuration, the female terminal can be arranged in a stable posture in a cavity by the angular portions.

(4) Preferably, the corner portion includes a linking portion inclined from the angular portion arranged on a front side in the connecting direction to the receiving portion.

According to this configuration, when the tab of the male terminal is inserted into the connection space, it can be suppressed that the tab is caught between the angular portions and the receiving portions.

Details of Embodiments of Present Disclosure

Specific examples of the present disclosure are described below with reference to the drawings. Note that the present invention is not limited to these illustrations and is intended to be represented by claims and include all changes in the scope of claims and in the meaning and scope of equivalents.

First Embodiment

Figure 3:
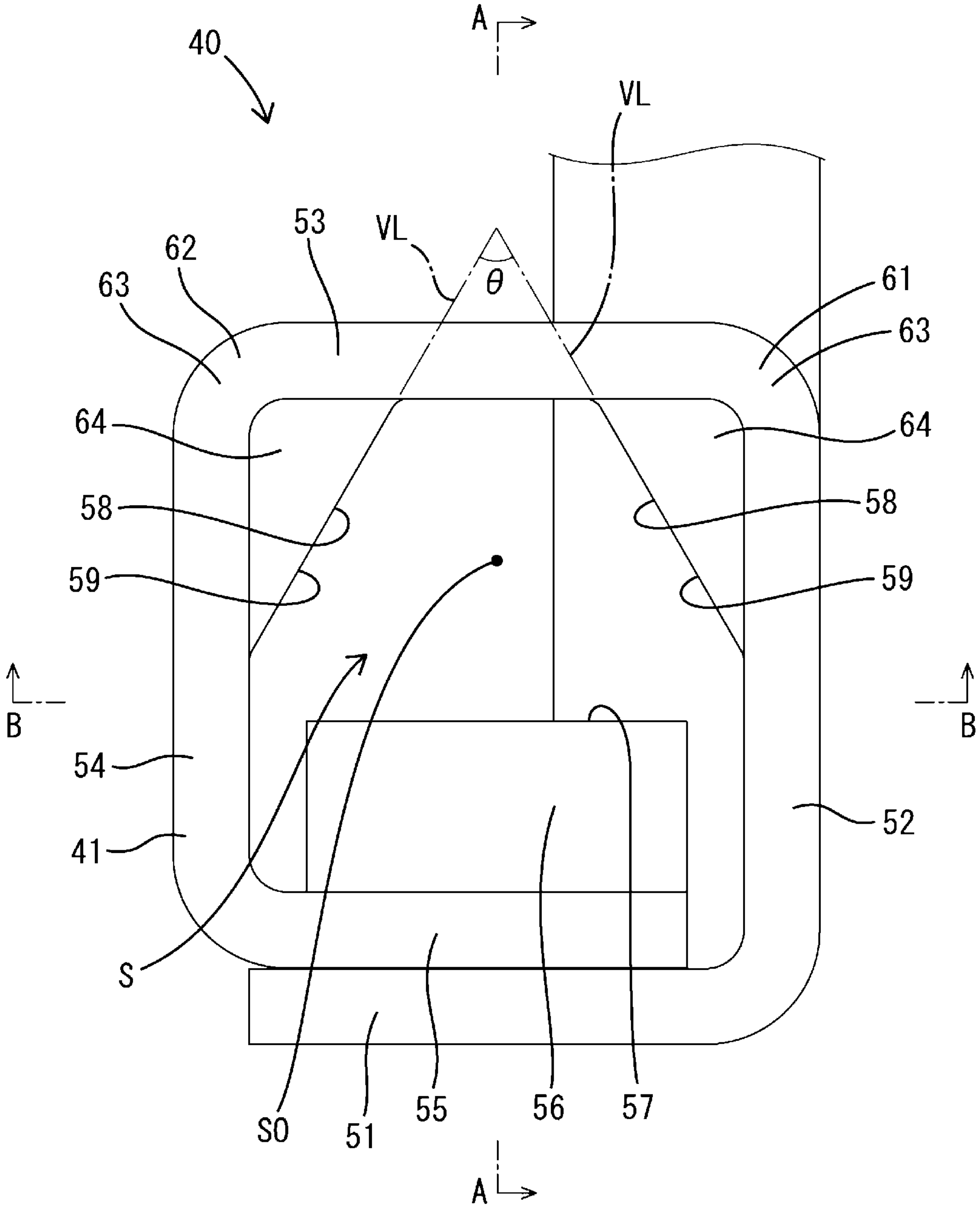
FIG. 3 is a front view of a body portion of the female terminal of the first embodiment.
Figure 4:
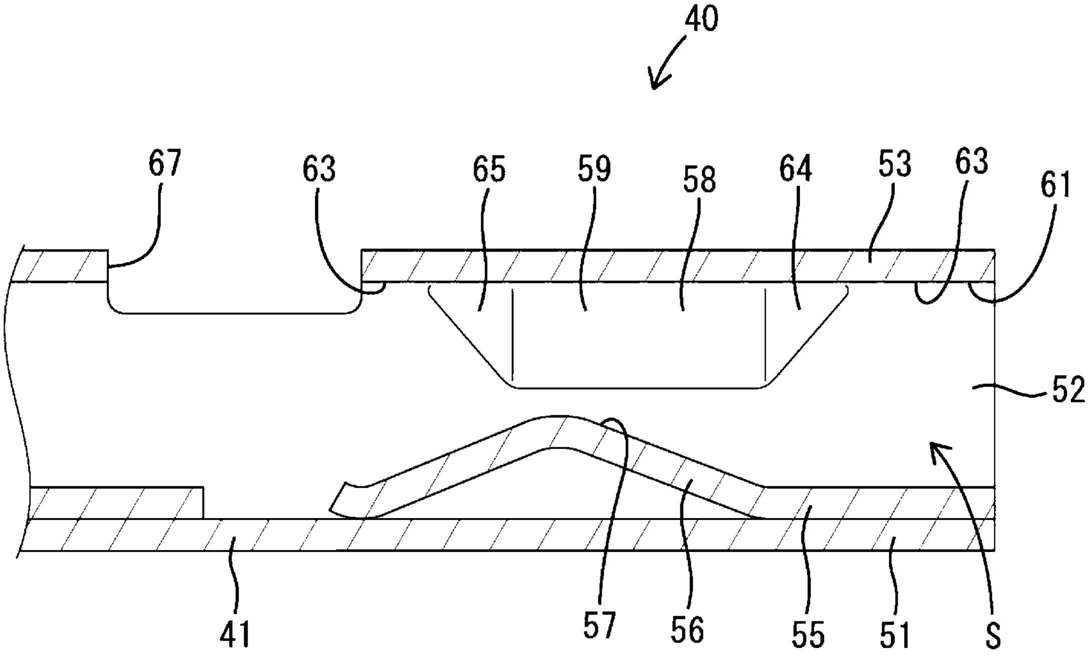
FIG. 4 is a section along A-A of FIG. 3.
Figure 5:
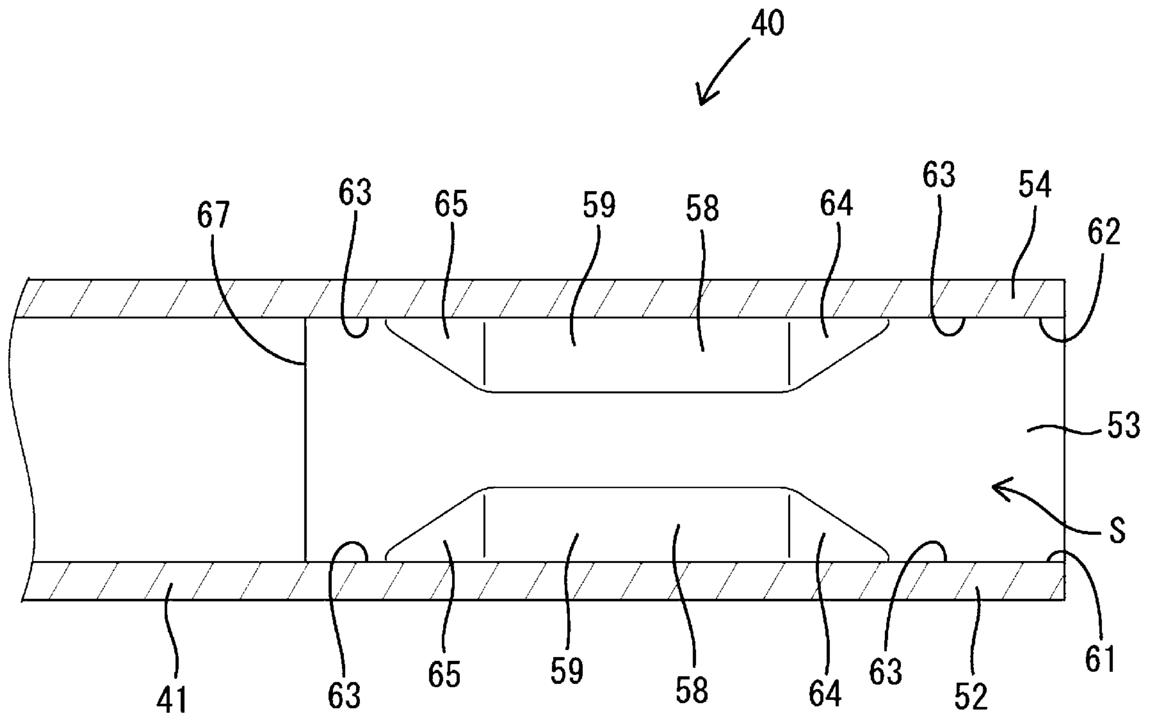
FIG. 5 is a section along B-B of FIG. 3.
Figure 6:
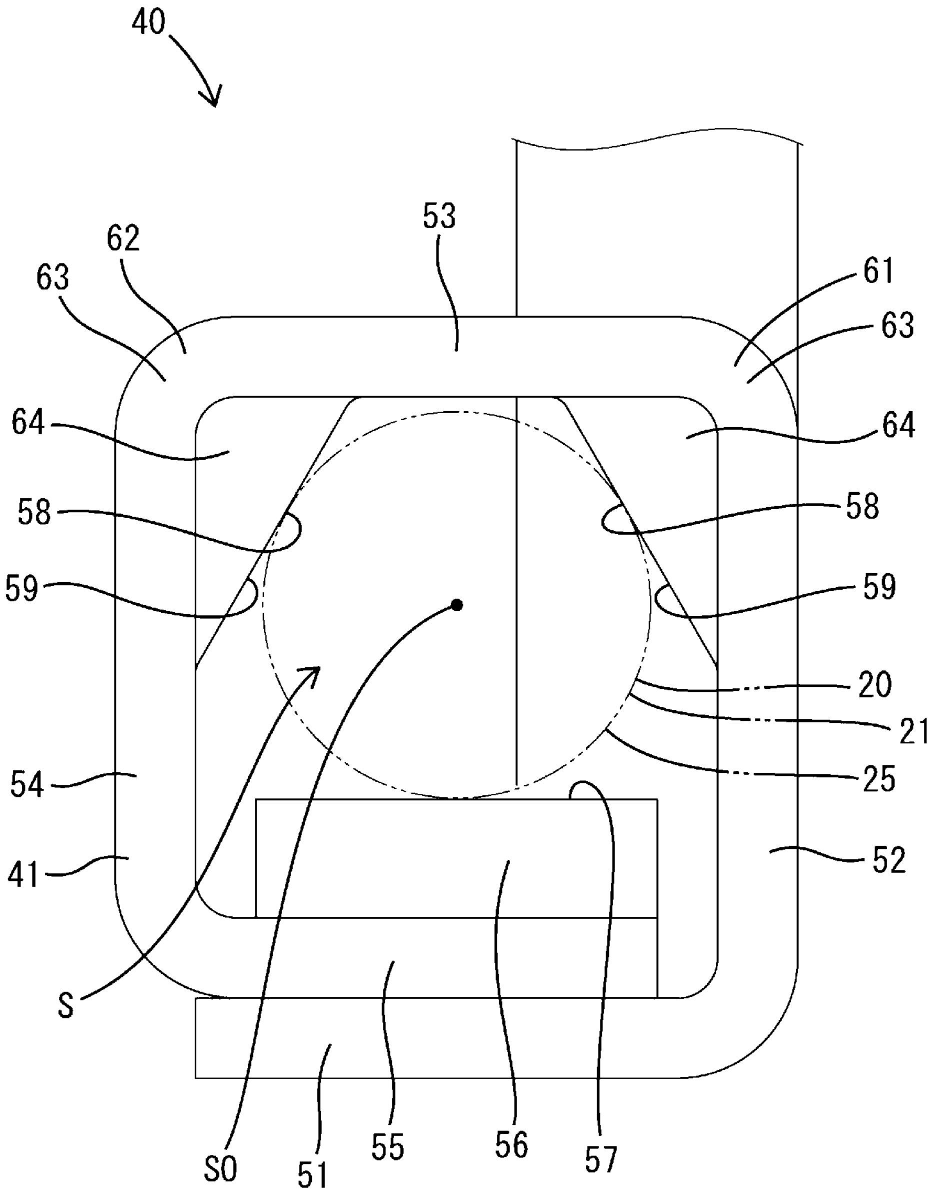
FIG. 6 is a front view showing a state where the male terminal is connected to the female terminal.

A terminal 10 of a first embodiment includes a male terminal 20 and a female terminal 40 to be connected to each other as shown in FIG. 1. Each of the male terminal 20 and the female terminal 40 is made of metal and formed, for example, by bending a metal plate. Note that, in the following description, sides facing each other when the male terminal 20 and the female terminal 40 are connected are referred to as front sides, a vertical direction shown in FIGS. 3, 4 and 6 is referred to as a height direction, and a lateral direction shown in FIGS. 3 and 6 and a vertical direction shown in FIG. 5 are referred to as a width direction. Further, a lateral direction in FIGS. 1, 4 and 5 corresponds to a connecting direction.

As shown in FIG. 1, the male terminal 20 is formed to extend straight. The male terminal 20 includes a tab 21, a male-side wire barrel 22 and a male-side insulation barrel 23. As shown in FIG. 6, the tab 21 has a circular outer peripheral surface in a lateral cross-section. As shown in FIG. 1, the tab 21 includes a hollow cylindrical portion 25 and a reduced diameter portion 26. The hollow cylindrical portion 25 has a hollow cylindrical shape and have a constant outer diameter. The reduced diameter portion 26 projects from the front end (tip) of the hollow cylindrical portion 25 and has an outer diameter reduced in a projecting direction.

As shown in FIG. 1, a wire 90 is connected to the male terminal 20. The wire 90 includes a core 91, which is a conductor, and a coating 92, which is an insulator. The core 91 is covered by the coating 92. The male-side wire barrel 22 of the male terminal 20 is crimped to the core 91 exposed by removing the coating 92. The male-side insulation barrel 23 of the male terminal 20 is crimped to the coating 92 of the wire 90.

As shown in FIG. 1, the female terminal 40 is L-shaped. The female terminal 40 includes a body portion 41, a bent portion 42, a female-side wire barrel 43 and a female-side insulation barrel 44. The body portion 41 is formed to extend straight and arranged to extend along the connecting direction. The female-side wire barrel 43 and the female-side insulation barrel 44 are arranged side by side along a direction intersecting (more specifically, orthogonal to) the connecting direction. The bent portion 42 is arranged between the body portion 41 and the female-side wire barrel 43, the female-side insulation barrel 44.

As shown in FIG. 1, a wire 93 is connected to the female terminal 40. The wire 93 includes a core 94, which is a conductor, and a coating 95, which is an insulator. The core 94 is covered by the coating 95. The female-side wire barrel 43 of the female terminal 40 is crimped to the core 94 exposed by removing the coating 95. The female-side insulation barrel 44 of the female terminal 40 is crimped to the coating 95 of the wire 93.

Figure 2:
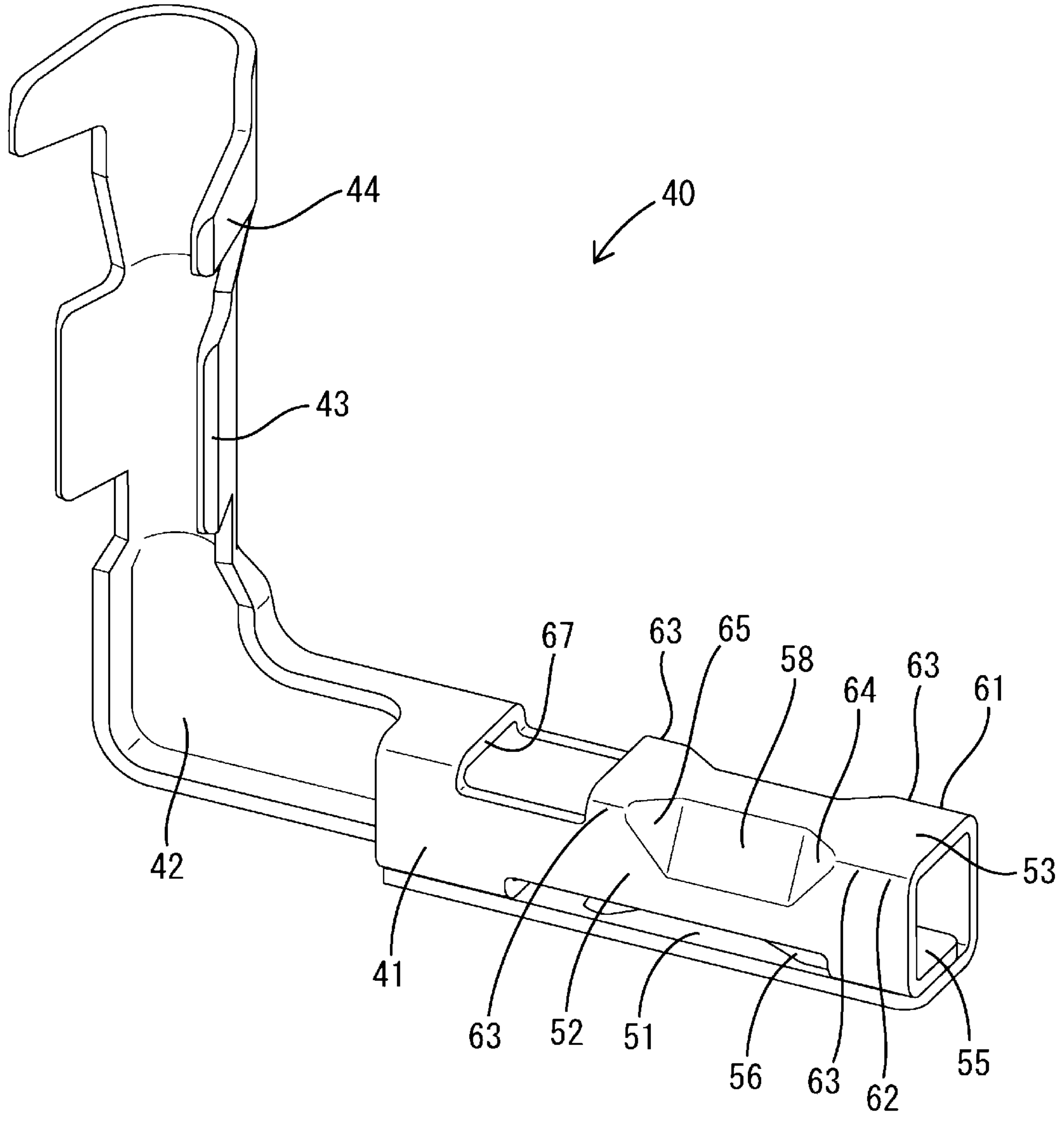
FIG. 2 is a perspective view of the female terminal of the first embodiment.

As shown in FIGS. 2 and 3, the body portion 41 has a tubular shape. More specifically, the body portion 41 is in the form of a rectangular tube having four walls. Each of the four walls is plate-like. The four walls include a first wall 51, a second wall 52, a third wall 53 and a fourth wall 54. The first and third walls 51, 53 are facing each other in the height direction. The second and fourth walls 52, 54 are facing each other in the width direction. The first and third walls 51, 53 are arranged orthogonally to the second and fourth walls 52, 54.

As shown in FIGS. 3 and 6, a connection space S in which the tab 21 is arranged is formed inside the body portion 41. Note that, in the following description, a center SO of the connection space S means a center of the connection space S when viewed from the connecting direction. The center SO of the connection space S is the same as a center of the tab 21 when the male terminal 20 and the female terminal 40 are connected.

As shown in FIGS. 3 and 4, the body portion 41 includes a supporting portion 55 and a resilient contact piece 56. The supporting portion 55 is plate-like. The supporting portion 55 is arranged on the side of the first wall 51 in the connection space S and arranged along the inner side surface of the first wall 51. Further, the supporting portion 55 is arranged orthogonally to the fourth wall 54 and coupled to the fourth wall 54.

As shown in FIGS. 3 and 4, the resilient contact piece 56 is plate-like and deflectable and deformable in the height direction. The resilient contact piece 56 is arranged on the side of the first wall 51 in the connection space S. The resilient contact piece 56 is connected to the fourth wall 54 via the supporting portion 55. The resilient contact piece 56 projects rearward from the supporting portion 55. A front end part of the resilient contact piece 56 serves as a fixed end fixed to the supporting portion 55 and a rear end part thereof serves as a free end. The resilient contact piece 56 has a bent shape having a central part in the connecting direction protruding toward the third wall 53 when viewed from the width direction.

As shown in FIG. 3, the resilient contact piece 56 has a variable connection surface 57 arranged toward the center SO of the connection space S. The variable connection surface 57 is formed at a position facing the third wall 53 in the height direction. A distance between the variable connection surface 57 and the center SO of the connection space S is variable due to the deflection and deformation of the resilient contact piece 56.

As shown in FIG. 3, the body portion 41 includes a pair of receiving portions 58. The pair of receiving portions 58 are arranged on a side opposite to the resilient contact piece 56 across the connection space S. The pair of receiving portions 58 have a pair of fixed connection surfaces 59. The pair of fixed connection surfaces 59 are flat surfaces. Distances between the pair of fixed connection surfaces 59 and the center SO of the connection space S are constant. The pair of fixed connection surfaces 59 are inclined to spread toward the variable connection surface 57. An opening angle of the pair of fixed connection surfaces 59 is constant in the connecting direction.

Here, the opening angle of the pair of fixed connection surfaces 59 is an angle of intersection θ at which virtual lines VL extending along the pair of fixed connection surfaces 59 intersect. The opening angle of the pair of fixed connection surfaces 59 is preferably 120° or less. According to this configuration, a width of the body portion 41 can be suppressed small and, consequently, a width of the female terminal 40 can be suppressed small. The opening angle of the pair of fixed connection surfaces 59 is more preferably 50° or more and 70° or less. The tab 21 is easily stabilized in position by being equally supported by the pair of fixed connection surfaces 59 and the variable connection surface 57 from three directions. Since the opening angle of the pair of fixed connection surfaces 59 at this time is 60°, the tab 21 can be more stably held by setting the opening angle in a range of 50° or more and 70° or less close to 50°.

As shown in FIG. 3, the body portion 41 includes a first corner portion 61 connecting the second wall 52 and the third wall 53 and a second corner portion 62 connecting the third wall 53 and the fourth wall 54. The first and second corner portions 61, 62 correspond to corner portions. As shown in FIGS. 4 and 5, each of the first and second corner portions 61, 62 includes the receiving portion 58 described above, angular portions 63, a linking portion 64 and a rear linking portion 65.

As shown in FIGS. 3 and 6, the angular portions 63 are shaped to protrude outward, and arranged on both sides in the connecting direction (front-rear direction) across the receiving portions 58.

As shown in FIGS. 4 and 5, the linking portion 64 is inclined toward the center SO of the connection space S from the angular portion 63 arranged on a front side, out of the angular portions 63 arranged on both sides in the connecting direction (front-rear direction), to the receiving portion 58. The linking portion 64 is tapered. The linking portion 64 is in the form of a curved surface connected to the angular portion 63 arranged on the front side in the connecting direction and the receiving portion 58.

As shown in FIGS. 4 and 5, the rear linking portion 65 is inclined toward the center SO of the connection space S from the angular portion 63 arranged on a rear side, out of the angular portions 63 arranged on both sides in the connecting direction (front-rear direction), to the receiving portion 58. The rear linking portion 65 is tapered. The rear linking portion 65 is in the form of a curved surface connected to the angular portion 63 arranged on the rear side in the connecting direction and the receiving portion 58.

As shown in FIG. 4, the body portion 41 includes an opening 67. The opening 67 is arranged behind the receiving portions 58 and open in the outer side surface of the third wall 53. The inside of the opening 67 communicates with the connection space S.

Functions and effects of the terminal 10 are described next.

When the male terminal 20 is connected to the female terminal 40, the hollow cylindrical portion 25 of the tab 21 of the male terminal 20 contacts the variable connection surface 57 and the pair of fixed connection surfaces 59 as shown in FIG. 6. Since the tab 21 has a circular cross-section, stability in a connected state of the male terminal 20 to the female terminal 40 is a problem. In this respect, the variable connection surface 57 is arranged toward the center SO of the connecting space S. Further, the pair of fixed connection surfaces 59 are arranged on the side opposite to the variable connection surface 57 across the connecting space S and inclined to spread toward the variable connection surface 57. Thus, the tab 21 can be stably held in the connecting space S. Moreover, the distance between the variable connection surface 57 and the center SO of the connecting space S is variable due to the deflection and deformation of the resilient contact piece 56, whereas the distances between the pair of fixed connection surfaces 59 and the center SO of the connecting space S are constant. That is, since a dimensional tolerance of the male terminal 20 can be absorbed only by one variable connection surface 57, management in manufacturing is easier. Further, since the opening angle of the pair of fixed connection surfaces 59 is constant in the connecting direction, the tab 21 can be guided in the connecting direction in a connection process. Therefore, it can be suppressed that the tab 21 is inclined in the connection process to contact the inner side surface of the body portion 41 (more specifically, four walls of the body portion 41).

Further, the body portion 41 is in the form of a rectangular tube having the four walls. The receiving portions 58 are formed by inclining the first corner portion 61 connecting the second and third walls 52, 53 and the second corner portion 62 connecting the third and fourth walls 53, 54. According to this configuration, the receiving portions 58 can be easily formed by press-working or the like.

Further, each of the first and second corner portions 61, 62 includes the angular portions 63 protruding outward on both sides in the connecting direction across the receiving portion 58. According to this configuration, the female terminal 40 can be arranged in a stable posture in a cavity of an unillustrated housing by the angular portions 63.

Further, each of the first and second corner portions 61, 62 includes the linking portion 64 inclined from the angular portion 63 arranged on the front side in the connecting direction to the receiving portion 58. According to this configuration, when the tab 21 of the male terminal 20 is inserted into the connecting space S, it can be suppressed that the tab 21 is caught between the angular portions 63 and the receiving portions 58.

Second Embodiment

A terminal 210 of a second embodiment differs from the terminal 10 of the first embodiment in that a female terminal 240 includes a locking lance 241, and is common in other points. Note that, in the description of the second embodiment, components similar to those of the first embodiment are described while being denoted by the same reference signs.

Figure 7:
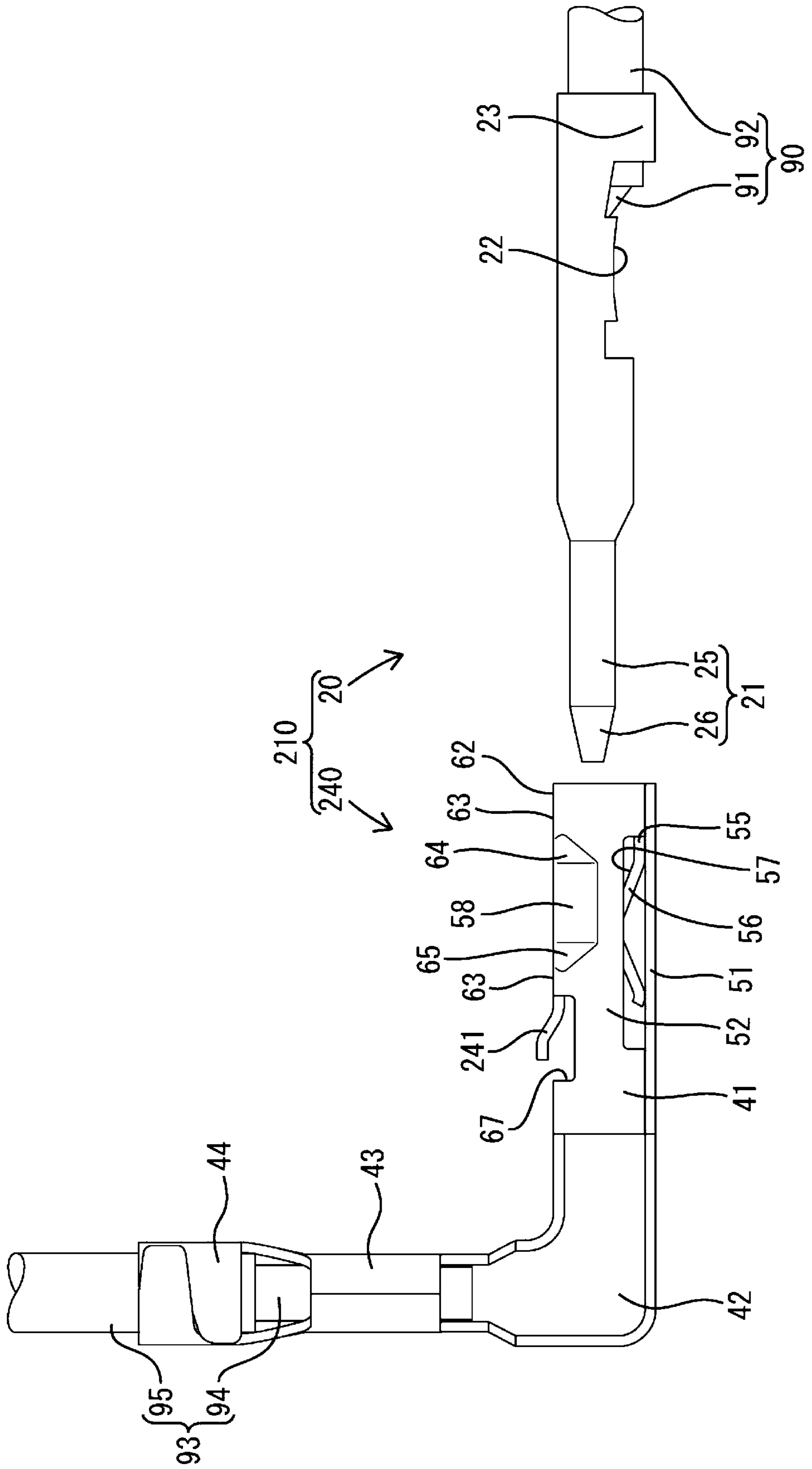
FIG. 7 is a side view of a male terminal and a female terminal of a second embodiment.

The terminal 210 of the second embodiment includes, as shown in FIG. 7, a male terminal 20 and the female terminal 240 to be connected to each other. The female terminal 240 includes a body portion 41, a bent portion 42, a female-side wire barrel 43, a female-side insulation barrel 44 and the locking lance 241.

Figure 8:
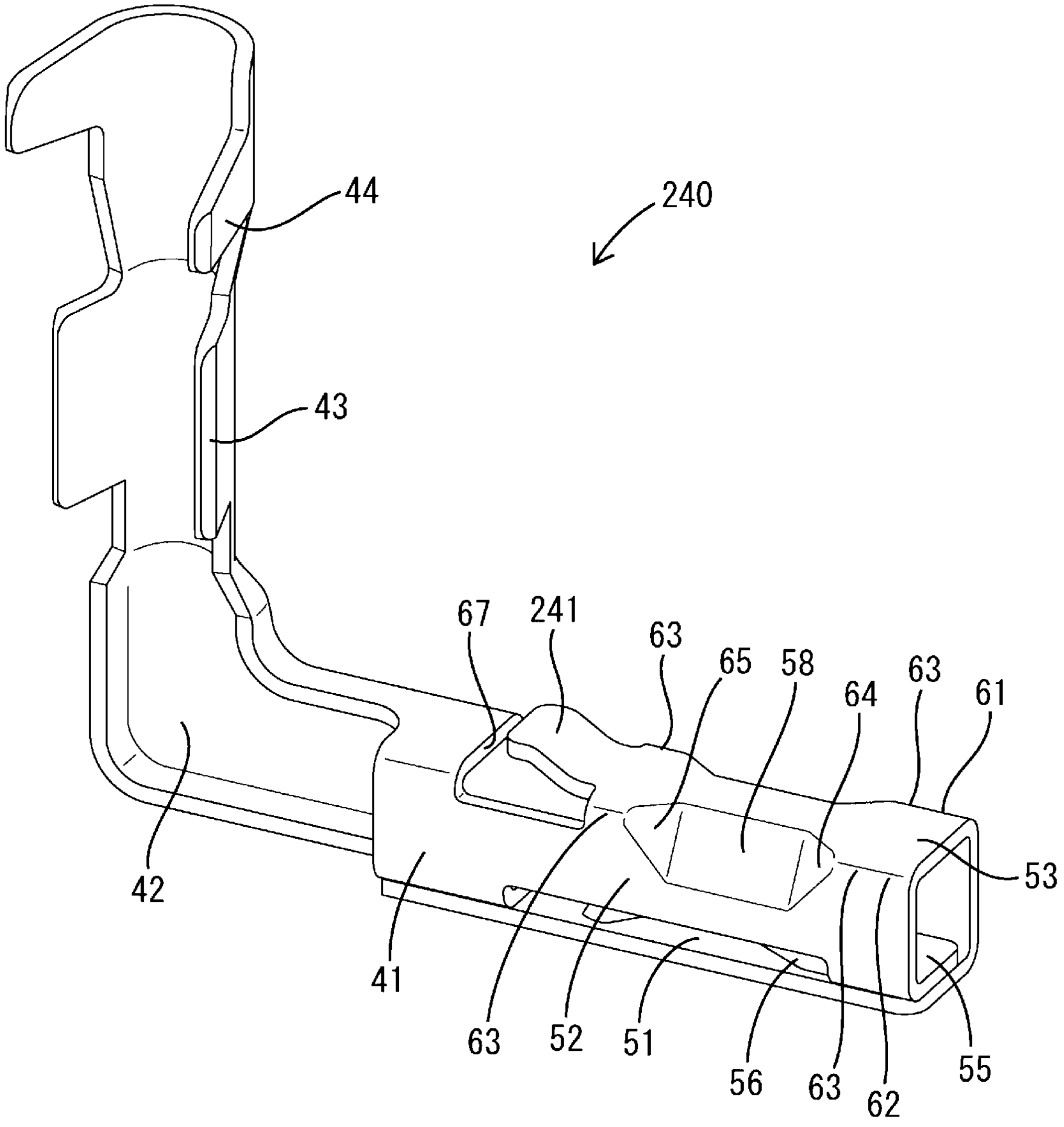
FIG. 8 is a perspective view of the female terminal of the second embodiment.

As shown in FIGS. 7 and 8, the locking lance 241 is plate-like. The locking lance 241 projects rearward from a front opening edge of an opening 67. The locking lance 241 is inclined rearward in a direction away from a connecting space S in a height direction, and extends rearward along the connecting direction from an intermediate position.

According to this configuration, since it is not necessary to provide a locking lance in a housing for accommodating the female terminal 240, the shape of the housing can be simplified.

Other Embodiments of Present Disclosure

The embodiments disclosed this time should be considered illustrative in all aspects, rather than restrictive.

(1) The resilient contact piece may not be cantilevered and, for example, may be supported on both ends serving as fixed ends.

(2) The female terminal may not be L-shaped and may be, for example, straight.

(3) The tab only has to have an outer periphery having a circular cross-section and may be solid.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A terminal assembly, comprising:

a male terminal including a tab having a circular cross-section; and a female terminal connected to the male terminal with each other and including a body portion having a connecting space formed therein, wherein:

the body portion of the female terminal includes a resiliently deformable resilient contact piece and a pair of receiving portions, the resilient contact piece has a variable connection surface arranged toward a center of the connecting space when viewed from a connecting direction of the male terminal to the female terminal, a distance between the variable connection surface and the center of the connection space is variable due to deflection and deformation of the resilient contact piece, the pair of receiving portions are arranged on a side opposite to the resilient contact piece across the connection space and have a pair of flat fixed connection surfaces inclined to spread toward the variable connection surface when viewed from a connecting direction of the male terminal to the female terminal, distances between the pair of fixed connection surfaces and the center of the connection space are constant, an opening angle of the pair of fixed connection surfaces is constant in the connecting direction, and the male terminal is held in the connection space by bringing the tab into contact with the variable connection surface and the pair of fixed connection surfaces when the tab is arranged in the connecting space.

2. The terminal assembly of claim 1, wherein:

the body portion is in the form of a rectangular tube having four walls, and the receiving portion is formed by inclining a corner portion connecting two adjacent ones of the walls.

3. The terminal assembly of claim 2, wherein the corner portion connecting the two adjacent ones of the walls includes angular portions protruding outward on both sides in the connecting direction across the receiving portion.

4. The terminal assembly of claim 3, wherein the corner portion includes a linking portion inclined from the angular portion arranged on a front side in the connecting direction to the receiving portion.

* * * * *